United States Patent
Kirwan

(12) 
(10) Patent No.: US 10,805,764 B1
(45) Date of Patent: Oct. 13, 2020

(54) OBJECT LOCATION TRACKING BASED ON POINT-IN-POLYGON ANALYSIS

(71) Applicant: Verizon Patent and Licensing Inc., Arlington, VA (US)

(72) Inventor: Bradley James Kirwan, Ashburton (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/363,882

(22) Filed: Mar. 25, 2019

(51) Int. Cl.
- G01S 5/00 (2006.01)
- H04W 64/00 (2009.01)
- H04W 4/021 (2018.01)

(52) U.S. Cl.
CPC ............ H04W 4/022 (2013.01); G01S 5/0063 (2013.01); H04W 64/003 (2013.01)

(58) Field of Classification Search
CPC .................................................... H04W 64/00
See application file for complete search history.

(56) References Cited

U.S. PATENT DOCUMENTS

| | | | | |
|---|---|---|---|---|
| 5,058,200 A | * | 10/1991 | Huang | G01S 5/14 455/456.2 |
| 2013/0242941 A1 | * | 9/2013 | Ebesu | H04W 36/245 370/331 |
| 2014/0370909 A1 | * | 12/2014 | Natucci, Jr. | H04W 52/0254 455/456.1 |
| 2019/0033078 A1 | * | 1/2019 | D'Alberto | G06Q 30/0267 |
| 2019/0098599 A1 | * | 3/2019 | Dixon | G06N 5/04 |

* cited by examiner

*Primary Examiner* — Charles N Appiah
*Assistant Examiner* — Frank E Donado

(57) ABSTRACT

A device can receive location data associated with an object. The device can determine a bounding area that encompasses a geographic area and determine a partitioning of the bounding area into a plurality of cells. The device can classify a cell of the plurality of cells as a first type that is entirely within the geographic area or a second type that is partially within the geographic area. The device can determine a rounded value of a latitude and a longitude included in the location data to identify a proximate location. The device can determine whether the proximate location matches a reference location associated with a vertex of the cell and identify the location as within the cell. The device, based on identifying the location as within the cell, can selectively determine whether the location of the object is within the geographic area and perform one or more actions.

20 Claims, 8 Drawing Sheets

100 ⟶

| Cell | Type | Vertex | Precision |
|---|---|---|---|
| 1 | First | (126°, 40°) | 1° |
| 2 | First | (127°, 40°) | 1° |
| 3 | First | (134°, 40°) | 1° |
| 4 | First | (129°, 39°) | 1° |
| ••• | ••• | ••• | ••• |
| 45 | Second | (128°, 40.5°) | 0.5° |
| 46 | Second | (128.5°, 40.5°) | 0.5° |
| ••• | ••• | ••• | ••• |

120
Generate a mapping of the plurality of cells to a cell type, a reference location associated with a cell vertex, and a cell precision 120
Generate a mapping of the plurality of cells to a cell type, a reference location associated with a cell vertex, and a cell precision

| Cell | Type | Vertex | Precision |
|---|---|---|---|
| 1 | First | (126°, 40°) | 1° |
| 2 | First | (127°, 40°) | 1° |
| 3 | First | (134°, 40°) | 1° |
| 4 | First | (129°, 39°) | 1° |
| ⋮ | ⋮ | ⋮ | ⋮ |
| 45 | Second | (128°, 40.5°) | 0.5° |
| 46 | Second | (128.5°, 40.5°) | 0.5° |
| ⋮ | ⋮ | ⋮ | ⋮ |

FIG. 1C

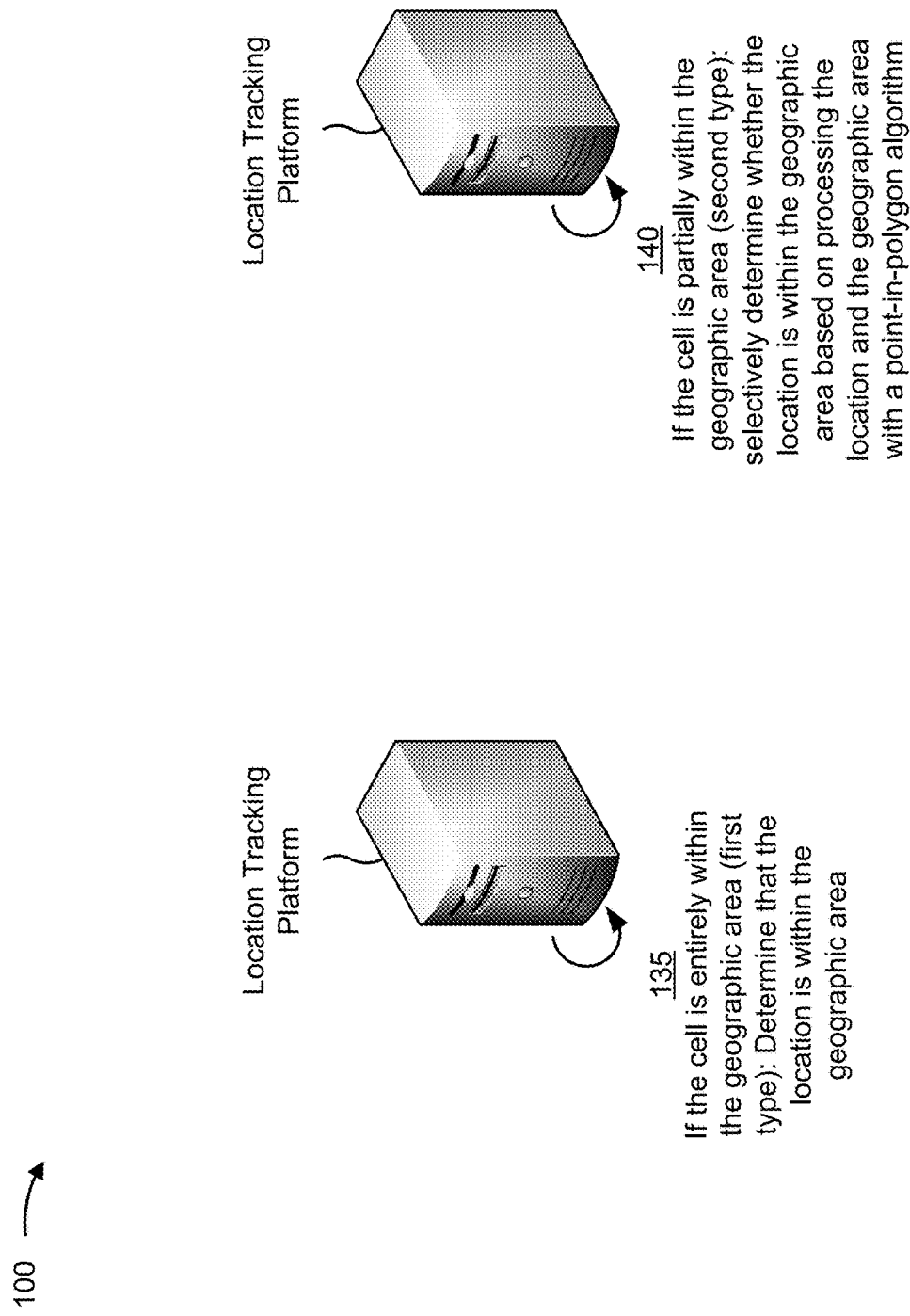

OBJECT LOCATION TRACKING BASED ON POINT-IN-POLYGON ANALYSIS

BACKGROUND

Object location tracking (e.g., vehicle location tracking) can provide a location of an object to, for example, an owner of the object or a custodian of the object that is remotely located from the object. In some cases, object location tracking can provide an indication as to whether an object entered a particular geographic area and/or a duration of time that the object remained in the particular geographic area.

BRIEF DESCRIPTION OF THE DRAWINGS

FIGS. 1A-1E are diagrams of one or more example implementations described herein.

DETAILED DESCRIPTION OF PREFERRED EMBODIMENTS

Figure 1A:
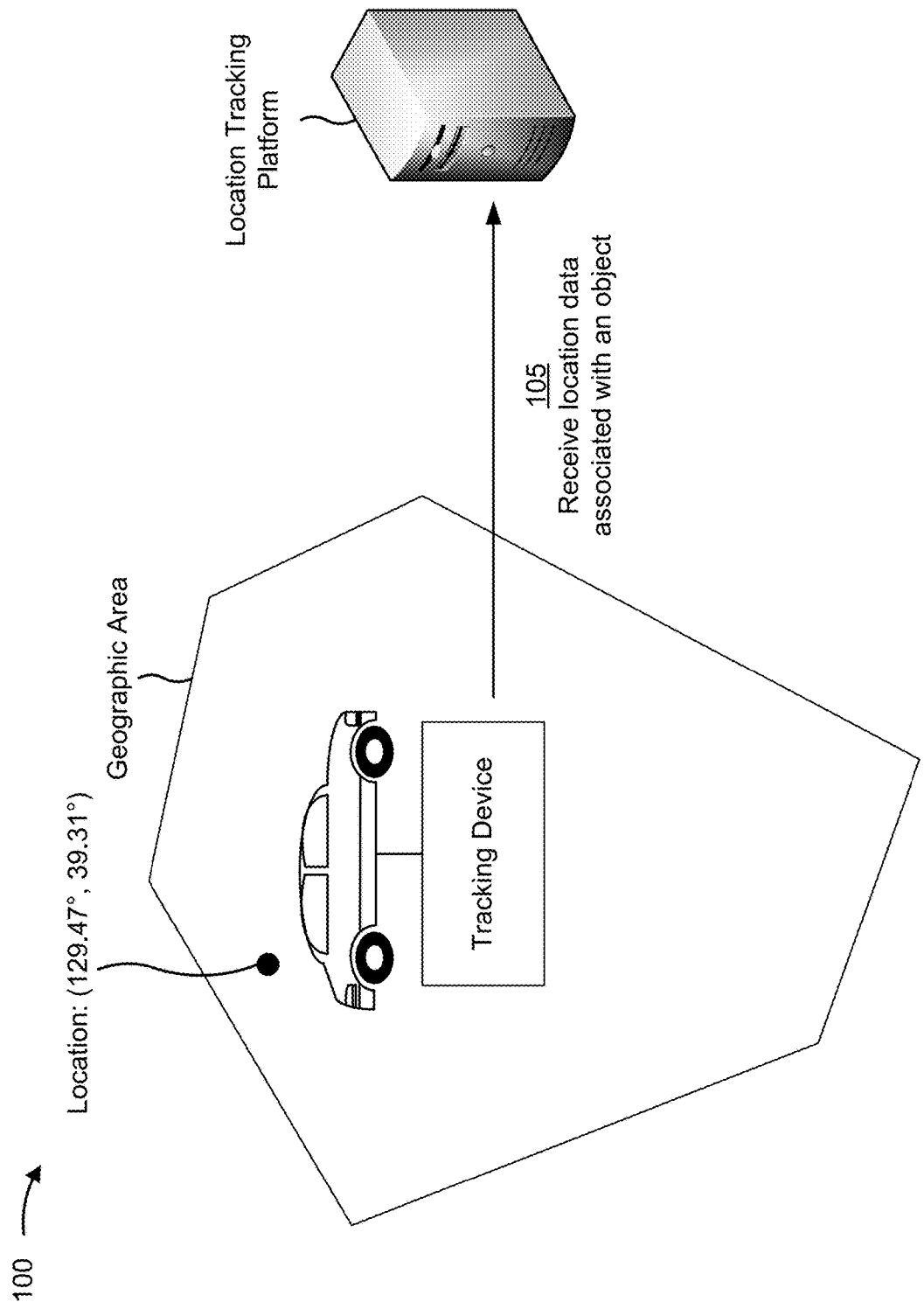

The following detailed description of example implementations refers to the accompanying drawings. The same reference numbers in different drawings can identify the same or similar elements.

As noted above, object location tracking (e.g., vehicle location tracking) can provide a location of an object to an owner of the object or a custodian of the object that is remotely located from the object. In some cases, object location tracking can provide an indication as to whether an object entered a particular geographic area and/or a duration of time that the object remained in the particular geographic area. For example, using current techniques for object location tracking, a location of an object can be represented as a point and a geographic area can be represented as a polygon. Continuing with the previous example, current techniques can determine whether the point is inside or outside of the polygon using a point-in-polygon algorithm, such as a ray casting algorithm. However, ray casting is performed by testing for an intersection of a ray, that extends from a point, with all sides of a polygon. As a result, ray casting consumes considerable computing resources when processing complex polygons with tens, hundreds, thousands, or more sides, such as a polygon representing a geographic area (e.g., a neighborhood, a county, a state, etc.).

Some implementations described herein can provide for object location tracking to determine whether a location of an object is within a geographic area. In some implementations, a tracking device associated with an object can provide location data relating to a location of the object (e.g., a location identified by a latitude and a longitude) to a location tracking platform. The location tracking platform can process the location data according to a locating technique to determine whether the location is within the geographic area. For example, the location tracking platform, using the locating technique, can determine a partitioning of a bounding area, that encompasses the geographic area, into a plurality of cells having precisions of latitudes and longitudes. The location tracking platform, using the locating technique, can classify a cell of the plurality of cells according to whether the cell is entirely within the geographic area (referred to herein as a "first type" of cell) or whether the cell is partially within the geographic area (referred to herein as a "second type" of cell). The location tracking platform, using the locating technique, can determine whether the location is within a cell by determining a proximate location, obtained by rounding a latitude and a longitude of the location to a precision of the cell, and determining whether the proximate location corresponds to a vertex of the cell. Based on determining that the location is within the cell, the location tracking platform, using the locating technique, can determine that the location is within the geographic area if the cell is the first type of cell, or selectively determine that the location is within the geographic area, based on further processing of the location and the geographic area (with, for example, a point-in-polygon algorithm) if the cell is the second type of cell.

In this way, when determining whether a location is within a geographic area, the location tracking platform, using the locating technique, conserves computing resources (e.g., processing resources, memory resources, and/or the like) by selectively processing the location using a point-in-polygon algorithm (e.g., ray casting). For example, a location determined to be within a cell of the first type can be identified as within the geographic area without performing a point-in-polygon algorithm, thereby conserving computing resources that would otherwise be wasted by performing the point-in-polygon algorithm. In addition, the locating technique provides an efficient, computationally-lightweight tool for determining whether a location of an object is within a geographic area. Accordingly, the location tracking platform can determine whether hundreds, thousands, millions, or more locations are within a geographic area in minutes rather than hours or days. As a result, the location tracking platform, using the locating technique, can experience a reduction in processing delays, crashing, and hardware failures caused by an overburdening of computing resources of the location tracking platform.

FIGS. 1A-1E are diagrams of one or more example implementations 100 described herein. As shown in FIGS. 1A-1E, example implementation(s) 100 can include a tracking device and a location tracking platform for tracking a location of an object.

For example, the tracking device (e.g., a telematics device, a user device, a vehicle "black box" device, a vehicle on-board device, a vehicle electronic control module (ECM), and/or the like) can obtain location data (e.g., global positioning system (GPS) data) relating to one or more locations of an object. The tracking device can be associated with the object. For example, the tracking device can be interconnected with the object (e.g., installed in a vehicle by providing a connection between the tracking device and a diagnostic system and/or information system of the vehicle) or provided in association with the object (e.g., attached to the object, carried by a driver of a vehicle, etc.).

The tracking device can transmit the location data to the location tracking platform (e.g., a location tracking platform including one or more server devices), or to another device that transmits the location data to the location tracking platform, and the location tracking platform can process the location data according to a locating technique to determine whether a particular location of the object is within a geographic area. In some implementations, a definition of the geographic area can be provided by a user of the location tracking platform. For example, a request from a user to track an object can include a definition of the geographic area. Additionally, or alternatively, a definition of the geographic area can be provided by an administrator of the location tracking platform. The definition can include a plurality of coordinates (e.g., latitude and longitude coordinates) that identify vertices of a polygon that defines the geographic area. In some implementations, the plurality of coordinates can be derived from an input (e.g., an input from a user or an administrator) with respect to a map interface (e.g., the user or the administrator can provide the input by drawing a polygon, or selecting points of a polygon, in a map interface). In some implementations, the plurality of coordinates can be derived from a boundary of a city, a county, a state, a province, a country, and/or the like. In some implementations, a geographic area can be a circle defined by a location (e.g., coordinates) and a radius extending from the location.

In some implementations, the object that is tracked by the tracking device and location tracking platform can be a vehicle, such as a car, a truck, a motorcycle, a scooter, a bicycle, a boat, an airplane, a helicopter, etc. In some implementations, the vehicle can be part of a fleet of vehicles associated with an entity (e.g., a courier services provider, a trucking services provider, a shipping services provider, etc.). In some implementations, a vehicle can be tracked in two dimensions (e.g., a car) or in three dimensions (e.g., an airplane). In some implementations, the object that is tracked by the tracking device and location tracking platform can be a person, an animal (e.g., a pet), a shipping container, a package, a personal item (e.g., a computer, a smartphone, a briefcase, etc.), and/or the like. While the description to follow will be described in terms of an example of tracking a physical object with regard to a geographic location, the description is not limited to this particular example. Implementations described herein also apply to tracking a virtual object (e.g., a video game object) with regard to a virtual location (e.g., to provide collision detection or solid wall behavior in a video game). In addition, the description is not limited to coordinates expressed in latitude and longitude. Implementations described herein also apply to cartesian coordinates, polar coordinates, and/or the like (e.g., in a case of tracking a virtual object). Furthermore, while the description to follow will discuss tracking a single object with regard to a single geographic area, the location tracking platform can provide location tracking for hundreds, thousands, millions, or more objects and geographic areas.

As shown in FIG. 1A, and by reference number 105, the location tracking platform can receive location data associated with an object. For example, the location tracking platform can receive location data from a tracking device that is associated with the object. The location data can include one or more coordinates (e.g., a latitude and a longitude) that identify one or more locations of the object. In some implementations, a location can be associated with a time that is included in the location data.

In some implementations, the location tracking platform can process the location data received from the tracking device in real time or near-real time. Additionally, or alternatively, the location tracking platform can store the location data in a data structure (e.g., a database, a linked list, a table, and/or the like) for later processing. For example, the later processing can be triggered by a request from a user that requests the location tracking platform to provide information regarding an entry of an object into, or a duration that the object spent in, the geographic area.

The location tracking platform can process the location data using a locating technique to determine whether a location, identified by the location data, is within the geographic area, as described below.

Figure 1B:
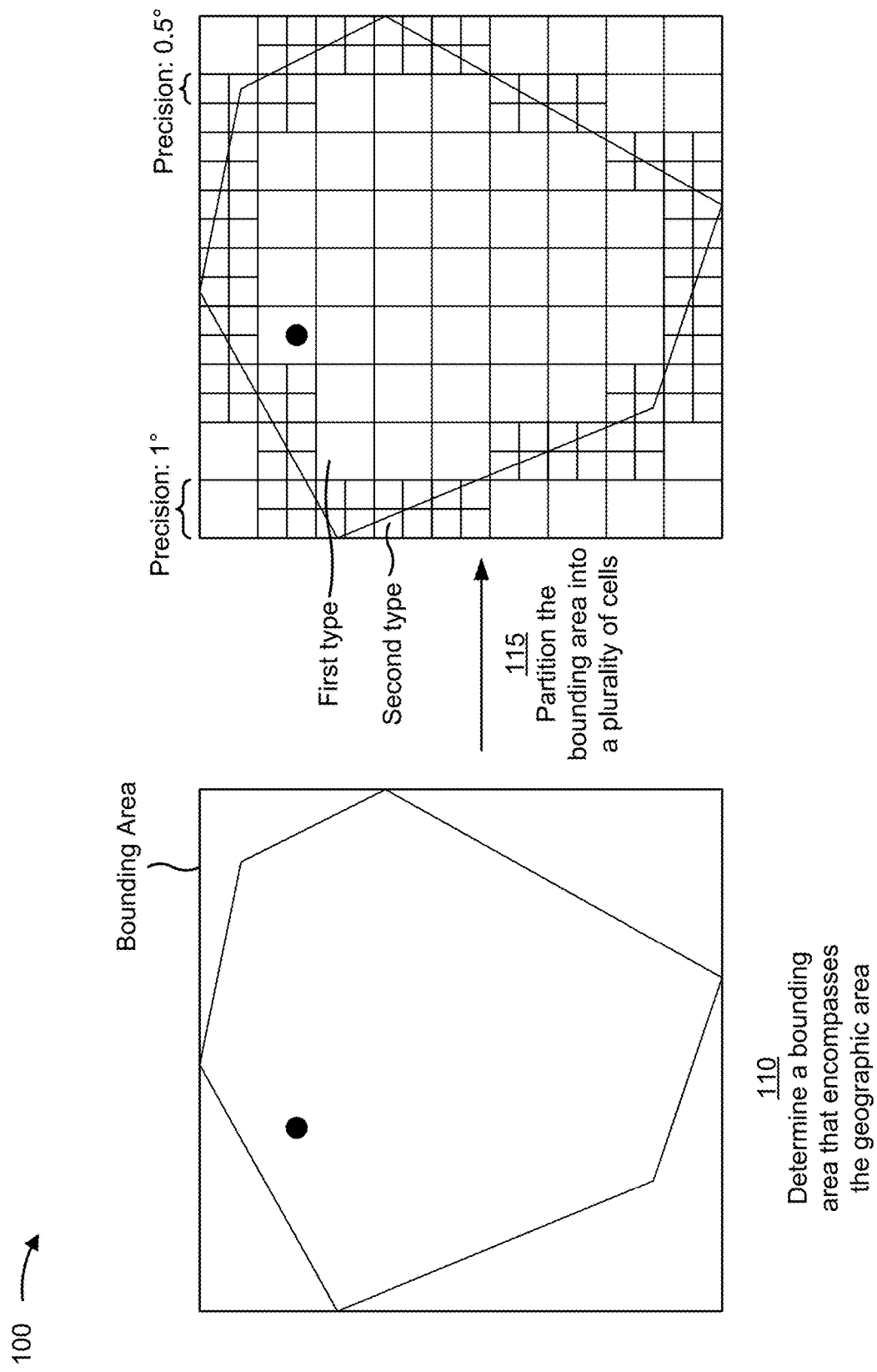

As shown in FIG. 1B, and by reference number 110, the location tracking platform (e.g., using the locating technique) can determine a bounding area that encompasses the geographic area. In some implementations, the bounding area can be a minimum bounding area. For example, the location tracking platform can determine the minimum bounding area based on a minimum and a maximum latitude of the geographic area and a minimum and a maximum longitude of the geographic area. In some implementations, the bounding area can be larger than a minimum bounding area. For example, the location tracking platform can determine a bounding area that is larger than a minimum bounding area to facilitate an initial partitioning of the bounding area into cells of equal size, as described below. In some implementations, the bounding area defines a rectangular area (e.g., a rectangular area relative to a two-dimensional space, such as a two-dimensional map, or a three-dimensional space, such as a three-dimensional map).

As shown by reference number 115, the location tracking platform (e.g., using the locating technique) can determine a partitioning of the bounding area into a plurality of cells. In some implementations, a cell can define a square area (e.g., a square area relative to a two-dimensional space or a three-dimensional space). For example, a cell can have a latitudinal dimension and a longitudinal dimension that are equivalent. In some implementations, the plurality of cells resulting from the partitioning of the bounding area can have different precisions of latitudes and longitudes.

For example, the location tracking platform can perform an initial partitioning of the bounding area into cells of equal size (e.g., four cells of equal size, 32 cells of equal size, 256 cells of equal size, etc.). The cells can include cells of the first type (i.e., cells that are entirely within the geographic area) and/or cells of the second type (i.e., cells that are partially within the geographic area). Cells completely outside the geographic area are of no interest. A precision of the initial partitioning (e.g., a precision that determines a cell size resulting from the initial partitioning, such as 32°×32°, 8°×8°, 2°×2°, etc.) can be configurable, such as by an administrator of the location tracking platform. For example, the precision can be selected to ensure that the cells resulting from the initial partitioning are respectively smaller in area than the geographic area. Accordingly, a precision for an initial partitioning of a first geographic area can be different than a precision for an initial partitioning of a second geographic area.

The location tracking platform can map cells of the first type resulting from the initial partitioning, as described below with regard to FIG. 1C. The location tracking platform can perform an additional partitioning of cells of the second type resulting from the initial partitioning (e.g., using a precision that is one half of a precision for the initial partitioning). This additional partitioning can produce one or more cells of the first type and/or one or more cells of the second type. Accordingly, the location tracking platform can map cells of the first type resulting from the additional portioning, as described below, and/or perform a further additional partitioning of cells of the second type resulting from the additional partitioning (e.g., using a precision that is one quarter of the precision for the initial partitioning). This process of additional partitioning of cells of the second type can continue until a threshold number of partitionings (e.g., 5, 15, 50, etc.), or a threshold minimum cell size (e.g., 0.25°×0.25°, 0.0625°×0.0625°, etc.), is satisfied. After an additional partitioning that results in satisfaction of the threshold number of partitionings or the threshold minimum cell size, the location tracking platform can map cells resulting from the additional partitioning (i.e., both cells of the first type and cells of the second type), as described below.

In this way, the additional partitionings can reduce an area of the geographic area that is associated with cells of the second type. Accordingly, the location tracking platform can classify a majority of the geographic area as cells of the first type. This permits the location tracking platform to reduce use of the point-in-polygon algorithm to thereby conserve computing resources that would otherwise be wasted.

In some implementations, the location tracking platform can classify a cell as the first type (i.e., entirely within the geographic area) or the second type (i.e., partially within the geographic area) after a partitioning step (e.g., an initial partitioning step or an additional partitioning step). The location tracking platform can classify a cell by determining whether a side of the cell intersects a side of the geographic area (e.g., using a straight line segment, or geodesic line segment, intersection test). The location tracking platform can classify the cell as the second type of cell when an intersection is determined. When the intersection is not determined, the location tracking platform can perform a point-in-polygon algorithm (e.g., ray casting) on coordinates (e.g., a latitude and a longitude) associated with a vertex of the cell to determine whether the coordinates are within the geographic area. The location tracking platform can classify the cell as the first type of cell when the coordinates are within the geographic area or discard the cell when the coordinates are outside of the geographic area.

As shown in FIG. 1C, and by reference number 120, the location tracking platform (e.g., using the locating technique) can generate a mapping relating to the plurality of cells resulting from the partitioning of the bounding area. For example, the location tracking platform can generate a mapping that associates a cell with a cell type (e.g., the first type of cell or the second type of cell), a reference location associated with a vertex of the cell (e.g., a reference latitude and a reference longitude associated with a northwest, a northeast, a southwest, or a southeast vertex of the cell), and a precision of the cell (e.g., a latitudinal dimension of the cell expressed in degrees of latitude or a longitudinal dimension of the cell expressed in degrees of longitude). In some implementations, the vertex can be a same vertex for the plurality of cells that are mapped (e.g., a southwest vertex).

The location tracking platform can store, or cause another device to store, the mapping in a data structure (e.g., a hash table, a database, a linked list, a table, and/or the like) that is accessible to the location tracking platform. Accordingly, after a bounding area is partitioned into a plurality of cells, and a mapping is generated for the plurality of cells, the location tracking platform can use the mapping to determine, at any subsequent time, whether a location is within a geographic area to which the mapping relates.

In some implementations, the location tracking platform can determine a partitioning of a bounding area into a plurality of cells and/or generate a mapping relating to the plurality of cells prior to receiving location data from a tracking device. This can permit the location tracking platform to determine whether a location is within the geographic area in real time or near-real time as the location data is received from the tracking device. Additionally, or alternatively, the location tracking platform can determine a partitioning of a bounding area into a plurality of cells and/or generate a mapping relating to the plurality of cells after receiving location data from the tracking device. This can permit the location tracking platform to determine whether a historical location is within the geographic area.

Figure 1D:
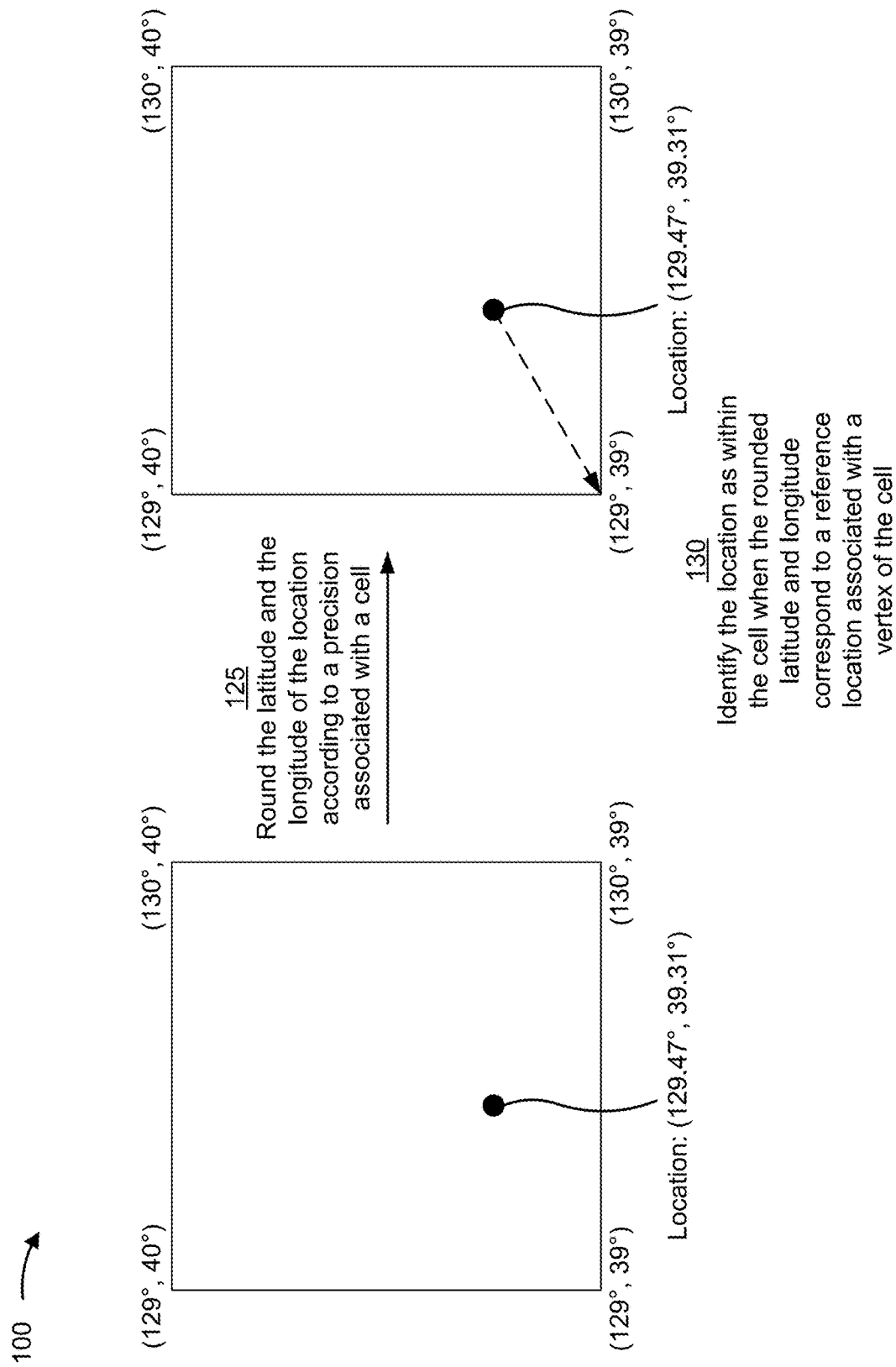

As shown in FIG. 1D, and by reference number 125, after obtaining location data that includes coordinates (e.g., a latitude and a longitude) identifying a location, the location tracking platform (e.g., using the locating technique) can determine a proximate location for the location. For example, the location tracking platform can determine the proximate location for the location by rounding the coordinates to a precision associated with one or more cells in the mapping.

In some implementations, the location tracking platform can perform an iterative process to determine a plurality of proximate locations for a location, which the location tracking platform can use for comparing to reference locations in the mapping. For example, the location tracking platform can perform a first iteration to determine a first proximate location for a location by rounding a latitude and a longitude of the location to a largest precision in the mapping (e.g., a precision of cells resulting from an initial partitioning, as described above), and to compare the first proximate location to one or more reference locations in the mapping. Continuing with the previous example, the location tracking platform can perform a second iteration to determine a second proximate location for the location by rounding the latitude and the longitude of the location to a next-largest precision in the mapping (e.g., a precision of cells resulting from a first additional partitioning, as described above), and to compare the second proximate location to one or more reference locations in the mapping. The location tracking platform can continue the iterative process until a match between a proximate location and a reference location is determined. If a match is not determined (e.g., after the location tracking platform has determined a proximate location based on all precisions in the mapping and compared the proximate location to reference locations in the mapping), the location tracking platform can determine that the location is not within the geographic area.

In some implementations, the latitude and the longitude of the location can be rounded in the same direction. For example, if the reference locations in the mapping relate to a southwest vertex of the plurality of cells, the latitude and the longitude can be rounded down. This ensures that a proximate location of the location will match a reference location of a cell when the location is within the cell. As another example, if the reference locations in the mapping relate to a northeast vertex of the plurality of cells, the latitude and the longitude can be rounded up. As a further example, the latitude can be rounded up and the longitude can be rounded down (e.g., if the reference locations relate to a northwest vertex of the plurality of cells) or vice versa (e.g., if the reference locations relate to a southeast vertex of the plurality of cells).

In this way, the location tracking platform can determine whether a location is within a cell by performing a single comparison between a proximate location of the location and a reference location associated with the cell. Accordingly, computing resources that would otherwise be wasted in comparing the location to four vertices of the cell (e.g., testing whether the location is southeast of the northwest vertex, northwest of the southeast vertex, etc., in order to determine whether the location is within the cell) can be conserved.

As shown by reference number 130, the location tracking platform (e.g., using the locating technique) can identify a location as being within a cell when a proximate location of the location corresponds to a reference location of the cell. For example, when performing the iterative process, the location tracking platform can determine that a proximate location matches a reference location. Continuing with the previous example, the location tracking platform, using the mapping, can determine a cell associated with the reference location and identify the location as within the cell. The location tracking platform also can use the mapping to identify a cell type (e.g., the first type of cell or the second type of cell) associated with the cell.

As shown in FIG. 1E, and by reference number 135, after identifying that a location is within a cell of the first type, the location tracking platform (e.g., using the locating technique) can determine that the location is within the geographic area. In this way, the location tracking platform can determine that the location of the object is within the geographic area without performing a point-in-polygon algorithm (e.g., ray casting), thereby conserving computing resources that would otherwise be used.

As shown by reference number 140, after identifying that a location is within a cell of the second type, the location tracking platform (e.g., using the locating technique) can determine whether the location is within the geographic area by further processing of the location and the geographic area. For example, the location tracking platform can determine whether the location is within the geographic area by processing the location and the geographic area with a point-in-polygon algorithm (e.g., a ray casting algorithm, a winding number algorithm, and/or the like).

In some implementations, the point-in-polygon algorithm can be a ray casting algorithm. The location tracking platform can perform the ray casting algorithm by determining a number of intersections between a ray, starting from the location (e.g., a latitude and a longitude) and extending in a fixed direction, and an edge of the geographic area (e.g., using a straight line segment, or geodesic line segment, intersection test). If the number of intersections is an even number, the location tracking platform can determine that the location is not within the geographic area. If the number of intersections is an odd number, the location tracking platform can determine that the location is within the geographic area.

In some implementations, the location tracking platform can process a location and a portion of the geographic area with the point-in-polygon algorithm. For example, the location tracking platform can determine an intersecting area between a cell (e.g., a cell in which the location is located) and the geographic area and process the location and the intersecting area with the point-in-polygon algorithm. In this way, the intersecting area has less vertices than the geographic area. As a result, the point-in-polygon algorithm can determine whether a location is within the intersecting area using fewer computing resources than needed to determine whether the location is within the geographic area. In some implementations, the location tracking platform can determine the intersecting area between the cell and the geographic area using a polygon clipping algorithm (e.g., a Sutherland-Hodgman algorithm, a Laing-Barsky algorithm, a Weiler algorithm, and/or the like).

In some implementations, after determining that the location of the object is within the geographic area, the location tracking platform can perform one or more actions. For example, based on determining that the location is within the geographic area, the location tracking platform can store (e.g., in a data structure) data that identifies an association between the object and the geographic area. The data can include coordinates (e.g., a latitude and a longitude) that identify the location and/or a time associated with the location (e.g., a time when the object was present at the location, a time when a tracking device obtained location data relating to the location, a time when the location tracking platform received the location data from the tracking device, and/or the like).

As another example, based on determining that the location is within the geographic area, the location tracking platform can generate a report identifying that the location (e.g., a historical location) of the object is within the geographic area. The report can be intended for a user of the location tracking platform (e.g., an owner or a custodian of the object). In some implementations, a report can identify a duration that the object is within the geographic area. For example, the location tracking platform can determine a difference between a time associated with a location determined to be within the geographic area (e.g., a location determined to be an earliest location of the object within the geographic area) and a subsequent time associated with a subsequent location determined to be outside of the geographic area (e.g., a location determined to be an earliest location of the object outside of the geographic area), to thereby determine the duration that the object is within the geographic area.

As a further example, based on determining that the location is within the geographic area, the location tracking platform can transmit a notification to a user device. In some implementations, the user device can be located remotely from the object (e.g., a user device associated with an owner or a custodian of the object). Additionally, or alternatively, the user device can be located with the object (e.g., a user device associated with a vehicle or an operator of the vehicle).

In some implementations, the notification can provide (e.g., in connection with a user device located remotely from the object) information that identifies the location of the object as within the geographic area. The notification also can identify a time associated with the location. In some implementations, the notification can provide and/or request (e.g., in connection with a user device located with the object) information that relates to the geographic area (e.g., points of interest in the geographic area, weather conditions in the geographic area, roadway conditions in the geographic area, and/or the like).

As indicated above, FIGS. 1A-1E are provided as examples. Other examples can differ from what is described with regard to FIGS. 1A-1E.

Figure 2:
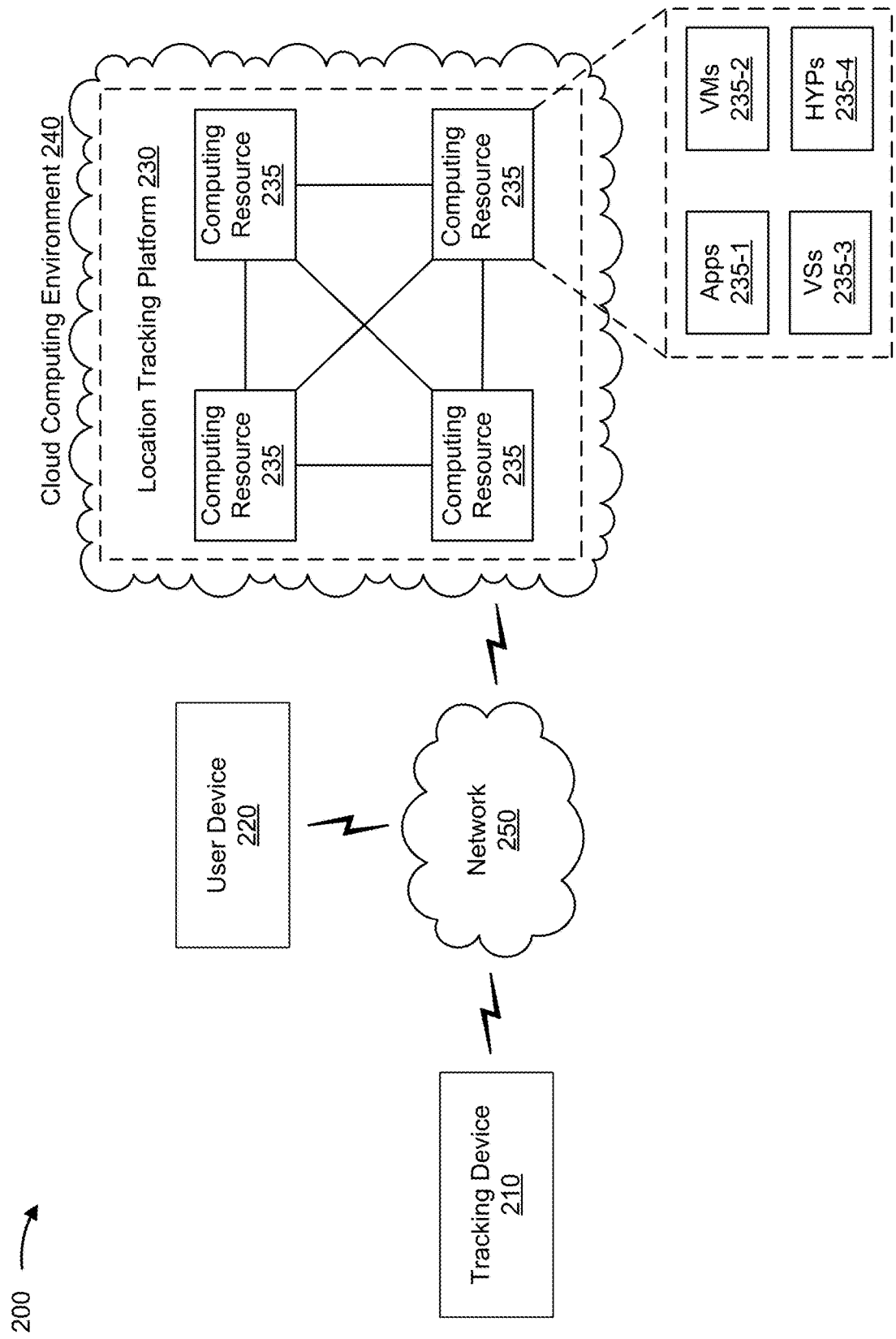
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a tracking device 210, a user device 220, a location tracking platform 230, a computing resource 235, a cloud computing environment 240, and a network 250. Devices of environment 200 can interconnect via wired connections, wireless connections, or a combination of wired and wireless connections.

Tracking device 210 includes one or more devices (e.g., electronic devices) capable of wireless communication (e.g., cellular communication), such as a telecommunication device. For example, tracking device 210 can include a computing device associated with a GPS, a modem, and/or a radio transceiver (e.g., a telematics device, a smartphone, a tablet computer, a handheld computer, a radiotelephone, a vehicle "black box" device, a vehicle on-board device, a vehicle ECM, etc.), or a similar device capable of performing location and/or communication functions. In some implementations, tracking device 210 can be associated with an object (e.g., a vehicle, a person, an animal, a shipping container, a package, a personal item, etc.). In some implementations, tracking device 210 can receive information from, and/or transmit information to, location tracking platform 230.

User device 220 includes one or more devices capable of receiving, generating, storing, processing, and/or providing information associated with object location tracking. For example, user device 220 can include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Location tracking platform 230 includes one or more computing resources associated with tracking a location of an object. For example, location tracking platform 230 can be a platform implemented by cloud computing environment 240 that can determine whether a location of an object is within a geographic area. In some implementations, location tracking platform 230 is implemented by computing resources 235 of cloud computing environment 240.

Location tracking platform 230 can include a server device or a group of server devices. In some implementations, location tracking platform 230 can be hosted in cloud computing environment 240. Notably, while implementations described herein describe location tracking platform 230 as being hosted in cloud computing environment 240, in some implementations, location tracking platform 230 can be non-cloud-based or can be partially cloud-based.

Cloud computing environment 240 includes an environment that delivers computing as a service, whereby shared resources, services, etc. can be provided to tracking device 210, user device 220, and/or the like. Cloud computing environment 240 can provide computation, software, data access, storage, and/or other services that do not require end-user knowledge of a physical location and configuration of a system and/or a device that delivers the services. As shown, cloud computing environment 240 can include location tracking platform 230 and computing resource 235.

Computing resource 235 includes one or more personal computers, workstation computers, server devices, or another type of computation and/or communication device. In some implementations, computing resource 235 can host location tracking platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by tracking device 210 and/or user device 220. Application 235-1 can eliminate a need to install and execute the software applications on tracking device 210 and/or user device 220. For example, application 235-1 can include software associated with location tracking platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program and can support a single process. In some implementations, virtual machine 235-2 can execute on behalf of a user (e.g., tracking device 210 and/or user device 220), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200. For example, location tracking platform 230 can perform one or more functions described as being performed by tracking device 210 and/or tracking device 210 can perform one or more functions described as being performed by location tracking platform 230.

Figure 3:
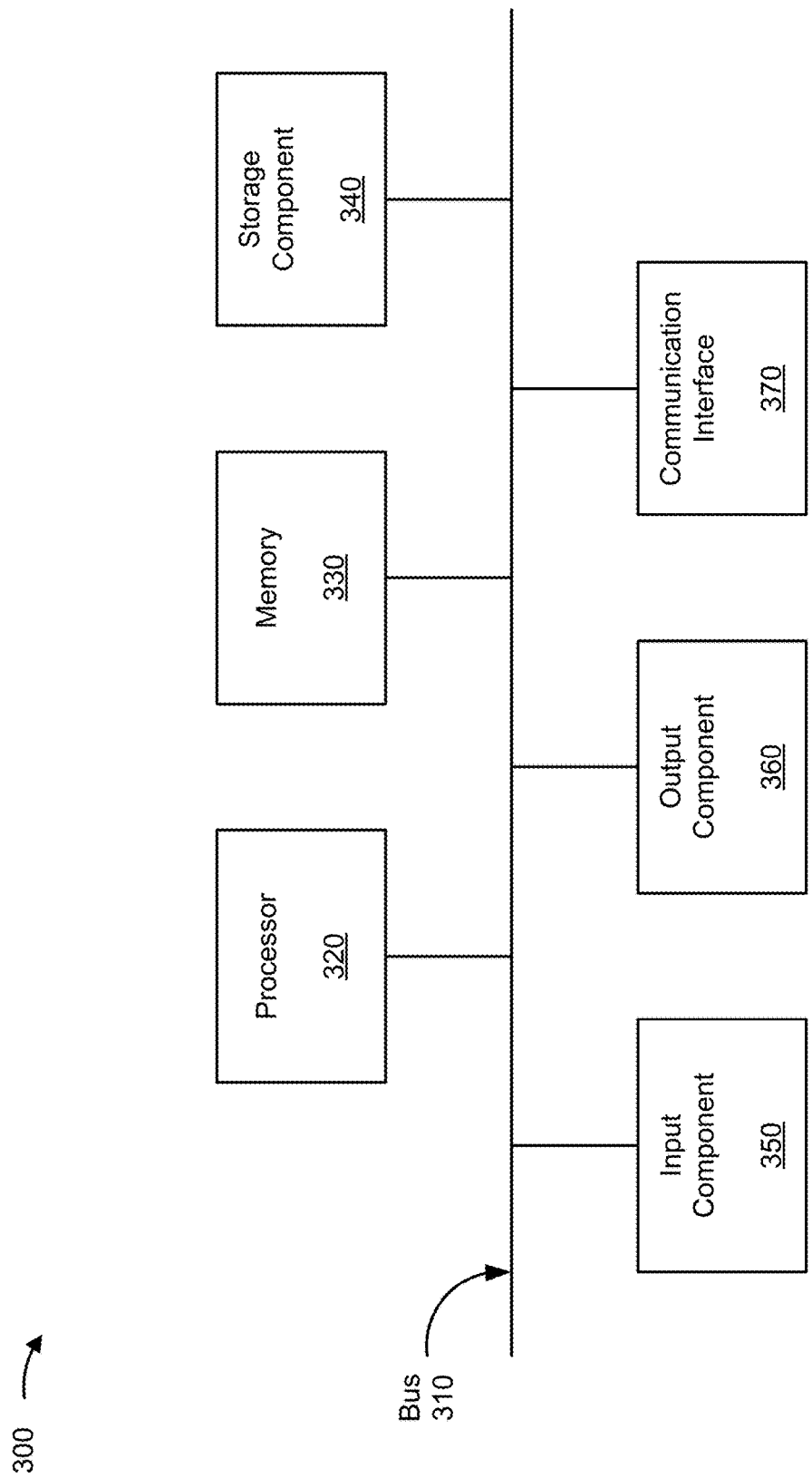
FIG. 3 is a diagram of example components of one or more devices of FIG. 2.

FIG. 3 is a diagram of example components of a device 300. Device 300 can correspond to tracking device 210, user device 220, location tracking platform 230, and/or computing resource 235. In some implementations tracking device 210, user device 220, location tracking platform 230, and/or computing resource 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a GPS component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
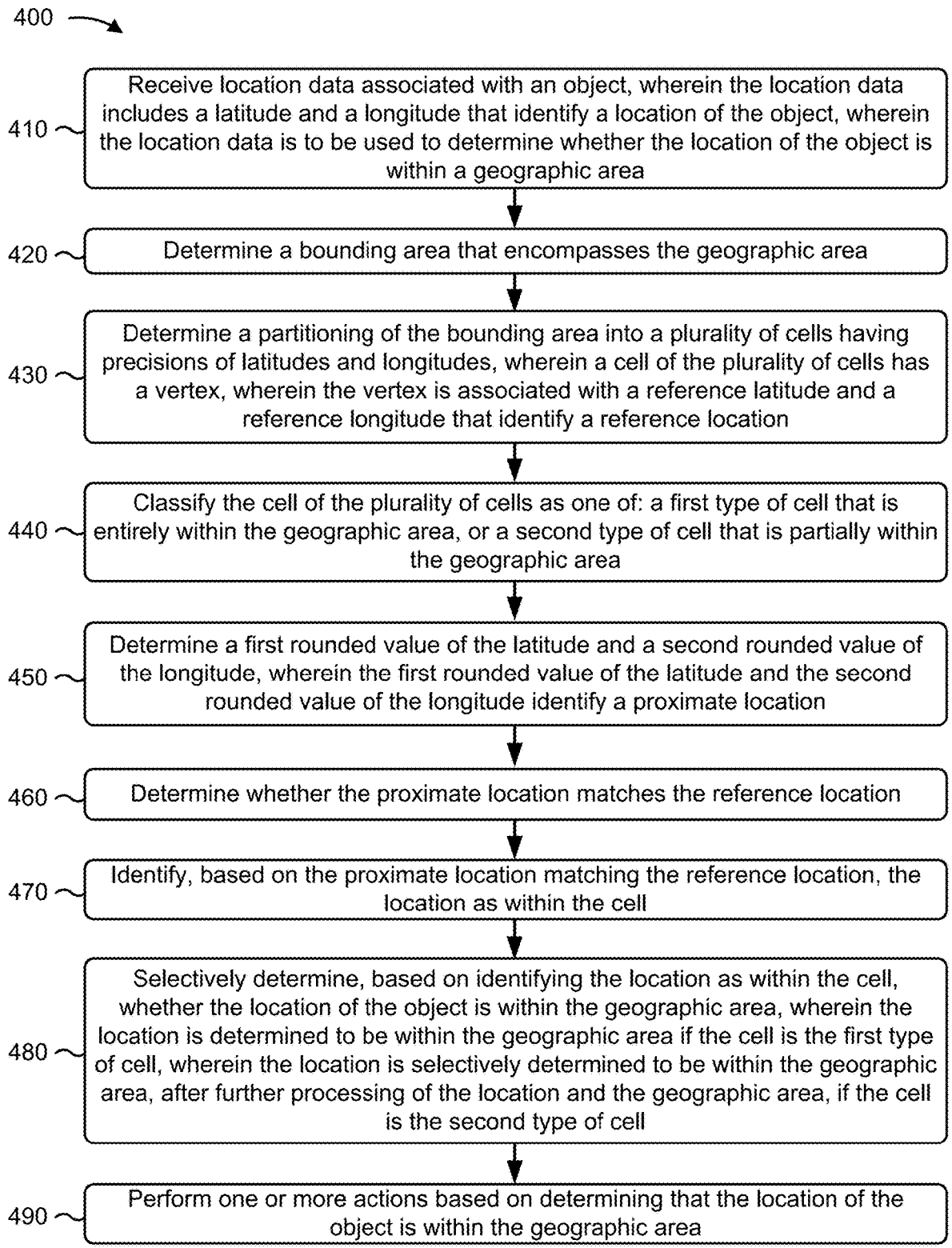
FIG. 4 is a flow chart of an example process for object location tracking based on point-in-polygon analysis.

FIG. 4 is a flow chart of an example process 400 for object location tracking. In some implementations, one or more process blocks of FIG. 4 can be performed by a location tracking platform (e.g., location tracking platform 230). In some implementations, one or more process blocks of FIG. 4 can be performed by another device or a group of devices separate from or including the location tracking platform, such as a tracking device (e.g., tracking device 210), a user device (e.g., user device 220), and/or the like.

As shown in FIG. 4, process 400 can include receiving location data associated with an object, wherein the location data includes a latitude and a longitude that identify a location of the object, and wherein the location data is to be used to determine whether the location of the object is within a geographic area (block 410). For example, the location tracking platform (e.g., using processor 320, memory 330, storage component 340, input component 350, communication interface 370, and/or the like) can receive location data associated with an object, as described above. In some aspects, the location data includes a latitude and a longitude that identify a location of the object. In some aspects, the location data is to be used to determine whether the location of the object is within a geographic area.

As further shown in FIG. 4, process 400 can include determining a bounding area that encompasses the geographic area (block 420). For example, the location tracking platform (e.g., using processor 320, memory 330, storage component 340, and/or the like) can determine a bounding area that encompasses the geographic area, as described above.

As further shown in FIG. 4, process 400 can include determining a partitioning of the bounding area into a plurality of cells having precisions of latitudes and longitudes, wherein a cell of the plurality of cells has a vertex, and wherein the vertex is associated with a reference latitude and a reference longitude that identify a reference location (block 430). For example, the location tracking platform (e.g., using processor 320, memory 330, storage component 340, and/or the like) can determine a partitioning of the bounding area into a plurality of cells having precisions of latitudes and longitudes, as described above. In some aspects, a cell of the plurality of cells has a vertex. In some aspects, the vertex is associated with a reference latitude and a reference longitude that identify a reference location.

As further shown in FIG. 4, process 400 can include classifying the cell of the plurality of cells as one of: a first type of cell that is entirely within the geographic area, or a second type of cell that is partially within the geographic area (block 440). For example, the location tracking platform (e.g., using processor 320, memory 330, storage component 340, and/or the like) can classify the cell of the plurality of cells as one of: a first type of cell that is entirely within the geographic area, or a second type of cell that is partially within the geographic area.

As further shown in FIG. 4, process 400 can include determining a first rounded value of the latitude and a second rounded value of the longitude, wherein the first rounded value of the latitude and the second rounded value of the longitude identify a proximate location (block 450). For example, the location tracking platform (e.g., using processor 320, memory 330, storage component 340, and/or the like) can determine a first rounded value of the latitude and a second rounded value of the longitude, as described above. In some aspects, the first rounded value of the latitude and the second rounded value of the longitude identify a proximate location.

As further shown in FIG. 4, process 400 can include determining whether the proximate location matches the reference location (block 460). For example, the location tracking platform (e.g., using processor 320, memory 330, storage component 340, and/or the like) can determine whether the proximate location matches the reference location, as described above.

As further shown in FIG. 4, process 400 can include identifying, based on the proximate location matching the reference location, the location as within the cell (block 470). For example, the location tracking platform (e.g., using processor 320, memory 330, storage component 340, and/or the like) can identify, based on the proximate location matching the reference location, the location as within the cell, as described above.

As further shown in FIG. 4, process 400 can include selectively determining, based on identifying the location as within the cell, whether the location of the object is within the geographic area, wherein the location is determined to be within the geographic area if the cell is the first type of cell, and wherein the location is selectively determined to be within the geographic area, after further processing of the location and the geographic area, if the cell is the second type of cell (block 480). For example, the location tracking platform (e.g., using processor 320, memory 330, storage component 340, and/or the like) can selectively determine, based on identifying the location as within the cell, whether the location of the object is within the geographic area, as described above. In some aspects, the location is determined to be within the geographic area if the cell is the first type of cell. In some aspects, the location is selectively determined to be within the geographic area, after further processing of the location and the geographic area, if the cell is the second type of cell.

As further shown in FIG. 4, process 400 can include performing one or more actions based on determining that the location of the object is within the geographic area (block 490). For example, the location tracking platform (e.g., using processor 320, memory 330, storage component 340, input component 350, output component 360, communication interface 370, and/or the like) can perform one or more actions based on determining that the location of the object is within the geographic area, as described above.

Process 400 can include additional implementations, such as any single implementation or any combination of implementations described below and/or in connection with one or more other processes described elsewhere herein.

In some implementations, the one or more actions can include storing data identifying an association between the object and the geographic area. In some implementations, the one or more actions can include transmitting a first notification to a first user device that is remotely located from the object identifying that the location of the object is within the geographic area. In some implementations, the one or more actions can include transmitting a second notification to a second user device that is located with the object providing or requesting information that relates to the geographic area. In some implementations, the one or more actions can include generating a first report identifying that the location of the object is within the geographic area. In some implementations, the one or more actions can include generating a second report identifying a duration that the object is within the geographic area based on a time associated with the location and a subsequent time associated with a subsequent location of the object that is determined to be not within the geographic area.

In some implementations, the location can be selectively determined to be within the geographic area, after further processing of the location and the geographic area with a point-in-polygon algorithm, if the cell is the second type of cell. In some implementations, the point-in-polygon algorithm is a ray casting algorithm or a winding number algorithm. In some implementations, the location can be selectively determined to be within the geographic area, after further processing of the location and a portion of the geographic area with a point-in-polygon algorithm, if the cell is the second type of cell. In some implementations, the portion of the geographic area can be an intersecting area of the geographic area and the cell.

In some implementations, determining the partitioning of the bounding area can include determining a first partitioning of the bounding area into a first plurality of cells, where the first plurality of cells includes one or more first cells of the first type of cell and one or more first cells of the second type of cell. In some implementations, determining the partitioning of the bounding area can include determining a second partitioning of the one or more first cells of the second type of cell into a second plurality of cells, where the second plurality of cells includes one or more second cells of the first type of cell and one or more second cells of the second type of cell. In some implementations, the plurality of cells can include the first plurality of cells and the second plurality of cells. In some implementations, the object can be a vehicle.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, location data associated with an object,
      wherein the location data includes a latitude and a longitude that identify a location of the object,
      wherein the location data is to be used to determine whether the location of the object is within a geographic area;
   determining, by the device, a bounding area that encompasses the geographic area;
   determining, by the device, a partitioning of the bounding area into a plurality of cells having precisions of latitudes and longitudes,
      wherein a cell of the plurality of cells has a directional vertex,
         wherein the directional vertex is associated with a reference latitude and a reference longitude that identify a reference location;
   classifying, by the device, the cell of the plurality of cells as one of:
      a first type of cell that is entirely within the geographic area, or
      a second type of cell that is partially within the geographic area;
   determining, by the device, a first rounded value of the latitude and a second rounded value of the longitude,
      the first rounded value of the latitude and the second rounded value of the longitude being rounded up or down based on a direction of the directional vertex, and
      the first rounded value of the latitude and the second rounded value of the longitude identifying a proximate location;
   determining, by the device, whether the proximate location matches the reference location;
   identifying, by the device and based on the proximate location matching the reference location, the location of the object as within the cell;
   selectively determining, by the device and based on identifying the location of the object as within the cell, whether the location of the object is within the geographic area,
      wherein the location of the object is determined to be within the geographic area when the cell is the first type of cell,
      wherein the location of the object is selectively determined to be within the geographic area, after further processing of the location of the object and the geographic area, when the cell is the second type of cell;
   determining, by the device, a duration that the object is within the geographic area when the cell is the first type of cell or the second type of cell by determining a difference between a time associated with the location of the object, when determined to be an earliest location of the object within the geographic area, and a subsequent time associated with a subsequent location of the object, determined to be an earliest location of the object outside of the geographic area; and
   performing, by the device, one or more actions based on determining that the location of the object is within the geographic area and determining the duration that the object is within the geographic area.

2. The method of claim 1, wherein the one or more actions include one or more of:
   storing data identifying an association between the object and the geographic area,
   transmitting a first notification to a first user device that is remotely located from the object identifying that the location of the object is within the geographic area,
   transmitting a second notification to a second user device that is located with the object providing or requesting information that relates to the geographic area,
   generating a first report identifying that the location of the object is within the geographic area, or generating a second report identifying the duration that the object is within the geographic area.

3. The method of claim 1, wherein the location of the object is selectively determined to be within the geographic area, after further processing of the location of the object and the geographic area with a point-in-polygon algorithm, if the cell is the second type of cell.

4. The method of claim 3, wherein the point-in-polygon algorithm is a ray casting algorithm or a winding number algorithm.

5. The method of claim 1, wherein the location of the object is selectively determined to be within the geographic area, after further processing of the location of the object and a portion of the geographic area with a point-in-polygon algorithm, if the cell is the second type of cell,
 wherein the portion of the geographic area is an intersecting area of the geographic area and the cell.

6. The method of claim 1, wherein determining the partitioning of the bounding area comprises:
 determining a first partitioning of the bounding area into a first plurality of cells,
  wherein the first plurality of cells includes one or more first cells of the first type of cell and one or more first cells of the second type of cell; and
 determining a second partitioning of the one or more first cells of the second type of cell into a second plurality of cells,
  wherein the second plurality of cells includes one or more second cells of the first type of cell and one or more second cells of the second type of cell,
  wherein the plurality of cells includes the first plurality of cells and the second plurality of cells.

7. The method of claim 1, wherein the object is a vehicle.

8. A device, comprising:
 one or more memories; and
 one or more processors, communicatively coupled to the one or more memories, to:
  receive location data associated with an object,
   wherein the location data includes a latitude and a longitude that identify a location of the object,
   wherein the location data is to be used to determine whether the location of the object is within a geographic area;
  determine a bounding area that encompasses the geographic area;
  determine a partitioning of the bounding area into a plurality of cells having precisions of latitudes and longitudes,
   wherein a cell of the plurality of cells has a directional vertex,
    wherein the directional vertex is associated with a reference latitude and a reference longitude that identify a reference location;
  classify the cell of the plurality of cells as one of:
   a first type of cell that is entirely within the geographic area, or
   a second type of cell that is partially within the geographic area;
  determine a first rounded value of the latitude and a second rounded value of the longitude,
   the first rounded value of the latitude and the second rounded value of the longitude being rounded up or down based on a direction of the directional vertex, and
   the first rounded value of the latitude and the second rounded value of the longitude identifying a proximate location;
  determine whether the proximate location matches the reference location;
  identify, based on the proximate location matching the reference location, the location of the object as within the cell;
  selectively determine, based on identifying the location of the object as within the cell, whether the location of the object is within the geographic area,
   wherein the location of the object is determined to be within the geographic area when the cell is the first type of cell,
   wherein the location of the object is selectively determined to be within the geographic area, after further processing of the location of the object and the geographic area, when the cell is the second type of cell;
  determine a duration that the object is within the geographic area when the cell is the first type of cell or the second type of cell by determining a difference between a time associated with the location of the object, when determined to be an earliest location of the object within the geographic area, and a subsequent time associated with a subsequent location of the object, determined to be an earliest location of the object outside of the geographic area; and
  perform one or more actions based on determining that the location of the object is within the geographic area and determining the duration that the object is within the geographic area.

9. The device of claim 8, wherein the one or more processors, when performing the one or more actions, are to one or more of:
 store data identifying an association between the object and the geographic area,
 transmit a first notification to a first user device that is remotely located from the object identifying that the location of the object is within the geographic area,
 transmit a second notification to a second user device that is located with the object providing or requesting information that relates to the geographic area,
 generate a first report identifying that the location of the object is within the geographic area, or
 generate a second report identifying the duration that the object is within the geographic area.

10. The device of claim 8, wherein the location of the object is selectively determined to be within the geographic area, after further processing of the location of the object and the geographic area with a point-in-polygon algorithm, if the cell is the second type of cell.

11. The device of claim 10, wherein the point-in-polygon algorithm is a ray casting algorithm or a winding number algorithm.

12. The device of claim 8, wherein the location of the object is selectively determined to be within the geographic area, after further processing of the location of the object and a portion of the geographic area with a point-in-polygon algorithm, if the cell is the second type of cell,
 wherein the portion of the geographic area is an intersecting area of the geographic area and the cell.

13. The device of claim 8, wherein the one or more processors, when determining the partitioning of the bounding area, are configured to:
 determine a first partitioning of the bounding area into a first plurality of cells,
  wherein the first plurality of cells includes one or more first cells of the first type of cell and one or more first cells of the second type of cell; and determine a second partitioning of the one or more first cells of the second type of cell into a second plurality of cells,
  wherein the second plurality of cells includes one or more second cells of the first type of cell and one or more second cells of the second type of cell,
  wherein the plurality of cells includes the first plurality of cells and the second plurality of cells.

14. The device of claim 8, wherein the object is a vehicle.

15. A non-transitory computer-readable medium storing instructions, the instructions comprising:
  one or more instructions that, when executed by one or more processors, cause the one or more processors to:
    receive location data associated with an object,
      wherein the location data includes a latitude and a longitude that identify a location of the object,
      wherein the location data is to be used to determine whether the location of the object is within a geographic area;
    determine a bounding area that encompasses the geographic area;
    determine a partitioning of the bounding area into a plurality of cells having precisions of latitudes and longitudes,
      wherein a cell of the plurality of cells has a directional vertex,
        wherein the directional vertex is associated with a reference latitude and a reference longitude that identify a reference location;
    classify the cell of the plurality of cells as one of:
      a first type of cell that is entirely within the geographic area, or
      a second type of cell that is partially within the geographic area;
    determine a first rounded value of the latitude and a second rounded value of the longitude,
      the first rounded value of the latitude and the second rounded value of the longitude being rounded up or down based on a direction of the directional vertex, and
      the first rounded value of the latitude and the second rounded value of the longitude identifying a proximate location;
    determine whether the proximate location matches the reference location;
    identify, based on the proximate location matching the reference location, the location of the object as within the cell;
    selectively determine, based on identifying the location of the object as within the cell, whether the location of the object is within the geographic area,
      wherein the location of the object is determined to be within the geographic area when the cell is the first type of cell,
      wherein the location of the object is selectively determined to be within the geographic area, after further processing of the location of the object and the geographic area, when the cell is the second type of cell;
    determine a duration that the object is within the geographic area when the cell is the first type of cell or the second type of cell by determining a difference between a time associated with the location of the object, when determined to be an earliest location of the object within the geographic area, and a subsequent time associated with a subsequent location of the object, determined to be an earliest location of the object outside of the geographic area; and
    perform one or more actions based on determining that the location of the object is within the geographic area and determining the duration that the object is within the geographic area.

16. The non-transitory computer-readable medium of claim 15, wherein the one or more instructions, that cause the one or more processors to perform the one or more actions, cause the one or more processors to one or more of:
  store data identifying an association between the object and the geographic area,
  transmit a first notification to a first user device that is remotely located from the object identifying that the location of the object is within the geographic area,
  transmit a second notification to a second user device that is located with the object providing or requesting information that relates to the geographic area,
  generate a first report identifying that the location of the object is within the geographic area, or
  generate a second report identifying the duration that the object is within the geographic area.

17. The non-transitory computer-readable medium of claim 15, wherein the location of the object is selectively determined to be within the geographic area, after further processing of the location of the object and the geographic area with a point-in-polygon algorithm, if the cell is the second type of cell.

18. The non-transitory computer-readable medium of claim 17, wherein the point-in-polygon algorithm is a ray casting algorithm or a winding number algorithm.

19. The non-transitory computer-readable medium of claim 15, wherein the location of the object is selectively determined to be within the geographic area, after further processing of the location of the object and a portion of the geographic area with a point-in-polygon algorithm, if the cell is the second type of cell,
  wherein the portion of the geographic area is an intersecting area of the geographic area and the cell.

20. The non-transitory computer-readable medium of claim 15, wherein the one or more instructions, that cause the one or more processors to determine the partitioning of the bounding area, cause the one or more processors to:
  determine a first partitioning of the bounding area into a first plurality of cells,
    wherein the first plurality of cells includes one or more first cells of the first type of cell and one or more first cells of the second type of cell; and
  determine a second partitioning of the one or more first cells of the second type of cell into a second plurality of cells,
    wherein the second plurality of cells includes one or more second cells of the first type of cell and one or more second cells of the second type of cell,
    wherein the plurality of cells includes the first plurality of cells and the second plurality of cells.

\* \* \* \* \*